United States Patent [19]
Goto

[11] Patent Number: 5,670,772
[45] Date of Patent: Sep. 23, 1997

[54] NON-CONTACT DATA RECORDING MEDIUM

[75] Inventor: Yuichi Goto, Hadano, Japan

[73] Assignee: Kabushiki Kaishi Toshiba, Kawasaki, Japan

[21] Appl. No.: 524,523

[22] Filed: Sep. 7, 1995

[30] Foreign Application Priority Data

Sep. 8, 1994 [JP] Japan ................... 6-214954

[51] Int. Cl.⁶ .................................... G06K 19/06
[52] U.S. Cl. ............................ 235/493; 235/492
[58] Field of Search ....................... 235/493, 492

[56] References Cited

U.S. PATENT DOCUMENTS

| | | | |
|---|---|---|---|
| 4,272,758 | 6/1981 | Giraud | 340/310 A |
| 4,692,604 | 9/1987 | Billings | 235/493 |
| 4,918,416 | 4/1990 | Walton et al. | 235/493 |
| 4,924,171 | 5/1990 | Baba et al. | 235/493 X |
| 5,013,898 | 5/1991 | Glasspool | 235/493 X |
| 5,326,965 | 7/1994 | Inoue | 235/493 X |
| 5,424,527 | 6/1995 | Takahira | 235/493 X |
| 5,436,441 | 7/1995 | Inoue | 235/493 X |

FOREIGN PATENT DOCUMENTS

| | | |
|---|---|---|
| 466 949 | 1/1992 | European Pat. Off. . |
| 1 502 273 | 3/1978 | United Kingdom . |
| 92/09175 | 5/1992 | WIPO . |

*Primary Examiner*—Donald T. Hajec
*Assistant Examiner*—Jeffrey R. Filipek
*Attorney, Agent, or Firm*—Cushman, Darby & Cushman IP Group of Pillsbury Madison & Sutro LLP

[57] ABSTRACT

An IC card having two coupling coils, two rectifier circuits, internal circuits, a voltage-adjusting circuit, a reset-signal generating circuit, and a wave-selecting circuit. The coils receives two carrier waves which are shifted in phase by 90°. The rectifier circuits rectify the carrier waves, generating direct-current voltages for the internal circuits. The voltage-adjusting circuit adjusts the direct-current voltages to a voltage of a predetermined value. The reset-signal generating circuit has hysteresis. The wave-selecting circuit selects one of the carrier waves and outputs the selected wave as a system clock signal. The system clock signal is stable, and the internal circuits can perform stable operations. The IC card can stably operate to receive data and transmit data. Furthermore, the IC can be easily made in the form of an LSI.

14 Claims, 6 Drawing Sheets

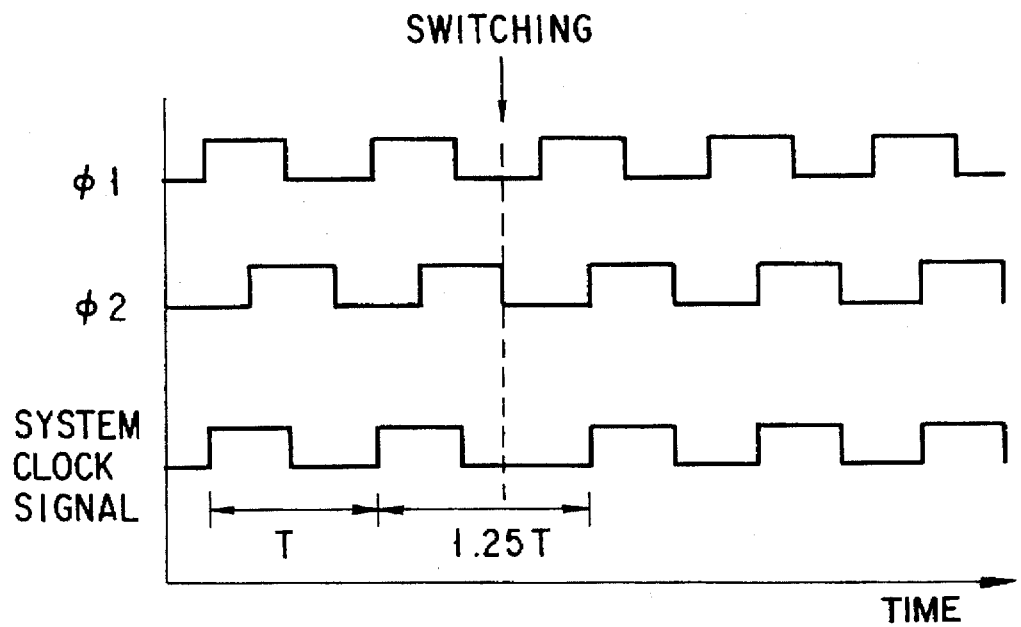
F I G. 4A
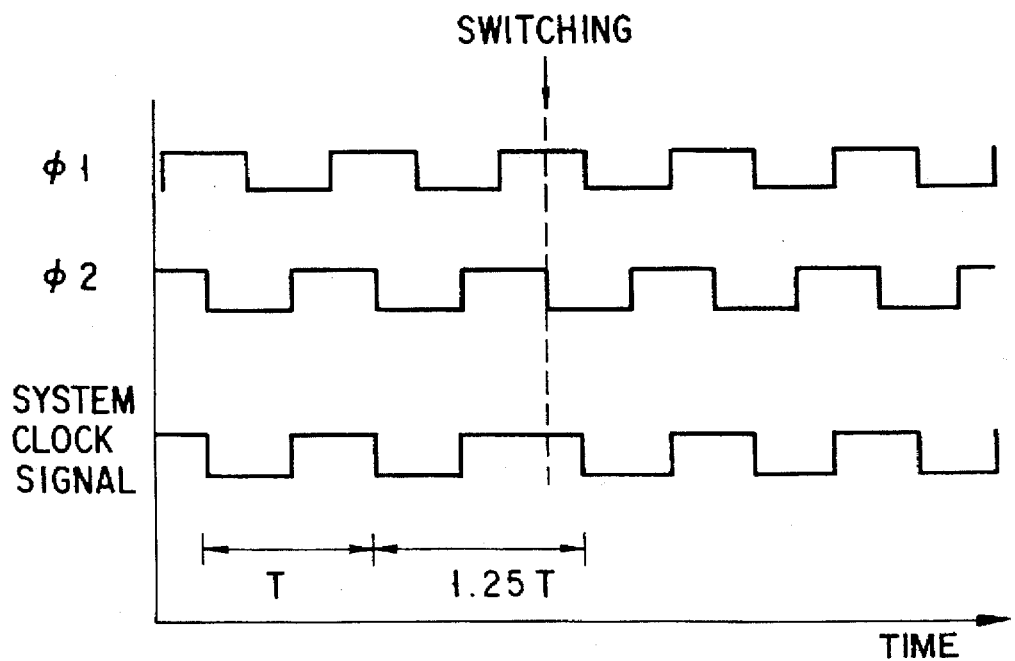
F I G. 4B

NON-CONTACT DATA RECORDING MEDIUM

BACKGROUND OF THE INVENTION

1. Field of the Invention

The present invention relates to a non-contact data recording medium such as an IC card, which can magnetically couple to a card reader/writer to receive power, data signals and clock signals from the card reader/writer and to supply data signals to the card reader/writer.

2. Description of the Related Art

Recently non-contact IC cards have been invented. They have no mechanical contacts and can be electromagnetically coupled to a card reader/writer to receive data from and supply data to the device. They can operate with high reliability. A non-contact IC card (hereinafter called "IC card") has two coupling coils and receives carrier waves modulated by a PSK (Phase Shift Keying) system. The carrier waves are rectified in the IC card, whereby power is supplied from the card reader/writer device to the IC card.

The IC card incorporates a CPU, an oscillator circuit, and a PLL (Phase-Locked Loop) circuit. The CPU needs to receive control signals such as a system clock signal and a reset signal, in order to perform its function. Generally, a system clock signal is generated by an oscillator circuit and a PLL circuit. To be more specific, the oscillator circuit generates a clock signal, which is supplied to the PLL circuit. Also supplied to the PLL circuit is a PSK-modulated signal. The PLL circuit renders the clock signal synchronous with the PSK-modulated signal, thereby producing a system clock signal.

The reset signal is supplied to the CPU upon the lapse of a predetermined time from the moment the power-supply voltage applied to the IC card falls below a prescribed value. In other words, the CPU is reset upon the lapse of that predetermined time.

The PLL circuit and the oscillator circuit, both required to generate the system clock signal, include analog circuit elements, e.g., capacitors and the like. It is therefore difficult to manufacture the PLL and oscillator circuits in the form of LSI (Large-Scale Integrated) circuits.

Since the reset signal is generated in accordance with the power-supply voltage only as described above, it may be generated at an improper moment, causing the CPU to operate unstably. That is, the reset signal is generated whenever the positional relation between them changes though very slightly, altering the magnetic coupling between the IC card and the card reader/writer and ultimately changing the power-supply voltage a little.

Moreover, the IC card must incorporate a circuit for receiving signals from and supplying signals to the card reader/writer. Restriction is imposed on the lay-out of the components of the circuit. Hence, stable receipt or transmission of signals is difficult to accomplish, particularly when the magnetic coupling between the IC card and the card reader/writer is weak.

SUMMARY OF THE INVENTION

The object of the present invention is to provide a non-contact data recording medium which incorporates neither a PLL circuit nor an oscillator circuit, which can yet generate a stable clock signal, the internal circuits of which can perform stable operations including data receipt and transmission, and which can be easily made in the form of an LSI.

According to a first aspect of this invention, there is provided a non-contact data recording medium which comprises a voltage-generating circuit, a reset circuit, and internal circuits. The voltage-generating circuit rectifies carrier waves received from a card reader/writer, thereby generating a power-supply voltage. The reset circuit resets the internal circuits when the power-supply voltage falls below the lowest operating voltage of the internal circuits (i.e., the lowest voltage at which the internal circuits can operate stably), and activates the internal circuits when the power-supply voltage rises above a predetermined operating voltage for the internal circuits. The reset circuit operates with hysteresis. Hence, the inner circuits can stably operate even if the power-supply voltage varies.

According to a second aspect of the invention, there is provided a non-contact data recording medium which comprises a wave-receiving circuit, a wave-demodulating circuit, and a wave-selecting circuit. The wave-receiving circuits receive two carrier waves which are shifted in phase. The wave-demodulating circuits demodulate the carrier waves supplied from the wave-receiving circuits, generating data signals. The wave-selecting circuit detect changes in the data signals, selects one of the two carrier waves in accordance with the changes detected, and generates a system clock signal from the carrier wave selected. The carrier wave selected is more stable in amplitude than the other input carrier wave. The system clock signal is therefore stable.

According to a third aspect of the invention, there is provided a non-contact data recording medium which comprises two coils, a wave-modulating circuit, a wave-selecting circuit, and internal circuits. Both coils are magnetically coupled to a card reader/writer. The wave-modulating circuit modulates the carrier wave supplied from the first coil and changes the load impedance of one of the coils for the half-cycle period of the carrier wave in accordance with the data superimposed on the carrier wave. Hence, the power loss in the IC card is small, and data is stably transmitted from the IC card to the card reader/writer. The wave-selecting circuit selects the carrier wave received by the coil whose load impedance does change, and generates the system clock signal. Thus, a stable system clock signal can be provided even while data is being transmitted from the IC card to the card reader/writer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 4A and 4B show the waveforms of system clock signals generated by the clock-switching circuit incorporated in the IC card;

DETAILED DESCRIPTION OF THE PREFERRED EMBODIMENTS

An embodiment of the present invention will be described, with reference to the accompanying drawings.

Figure 1:
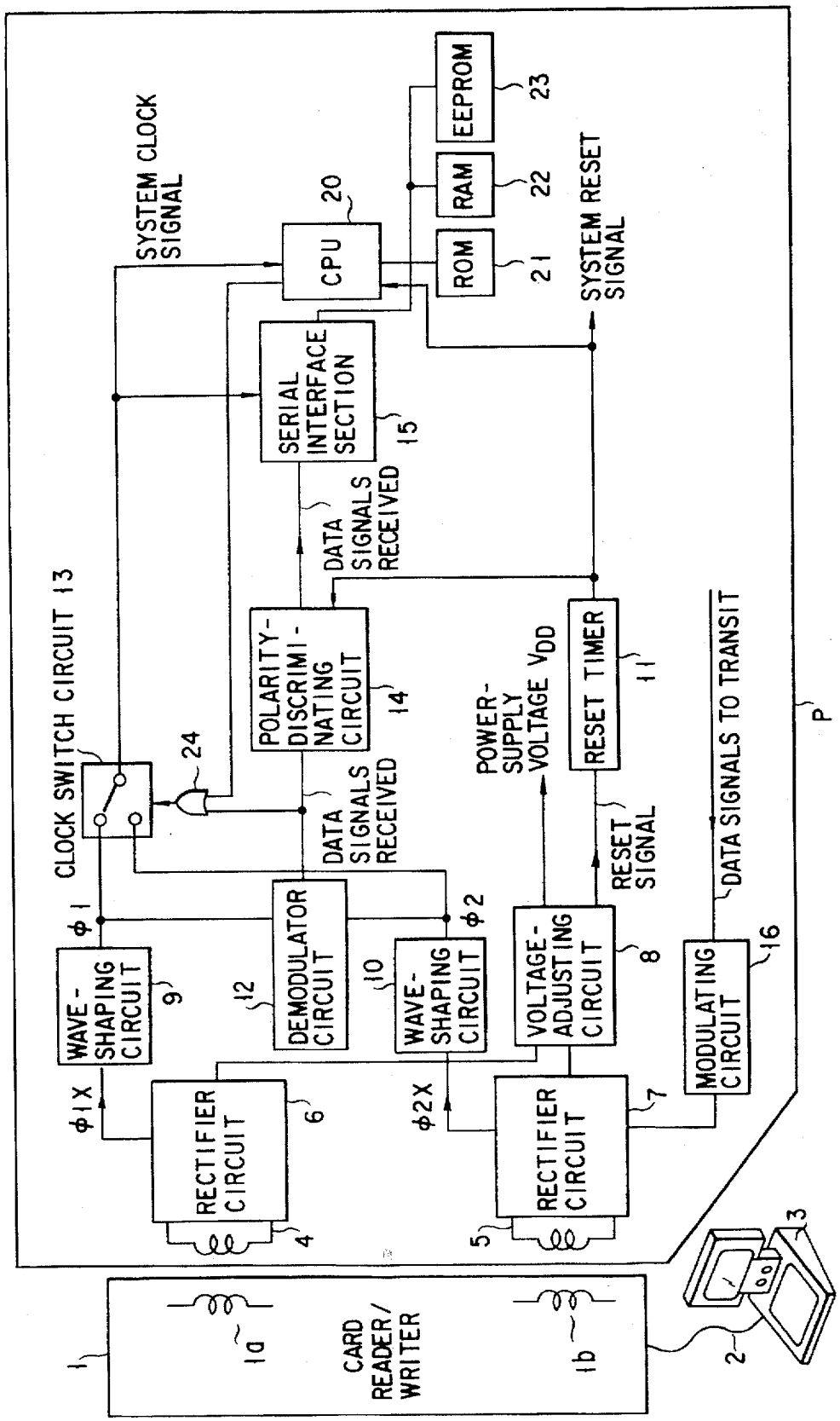
FIG. 1 is a block diagram schematically showing an non-contact IC card according the present invention.

FIG. 1 schematically shows the embodiment of the invention, which is an non-contact IC card P. As shown in FIG. 1, the IC card P receives PSK-modulated data signals from the coupling coils 1a and 1b, both incorporated in a card reader/writer 1. The card reader/writer 1 receives modulated data signals transmitted from the IC card P and demodulates these data signals. The demodulated signals are supplied via a communication line 2 to a host computer 3. The host computer 3 processes the data signals and supplies the processed signals to the card reader/writer 1 through the communication line 2. The card reader/writer 1 PSK-modulates the processed signals, generating modulated data signals. The modulated data signals are transmitted from the coupling coils 1a and 1b to the coupling coils 4 and 5 provided in the IC card P.

To transmit data from the IC card P to the card reader/writer 1, the input impedance of the coupling coil 4 or 5 is varied, thereby changing the intensity of a high-frequency magnetic field. The changes in the intensity of the magnetic field are detected by the coupling coils 1a and 1b. That is, the card reader/writer 1 receives the data from the IC card P.

To transmit data from the card reader/writer 1 to the IC card P, the coupling coils 1a and 1b emanate two high-frequency magnetic fields which are shifted in phase by 90°. These magnetic fields used as carrier waves reach the coupling coils 4 and 5 of the IC card P. By virtue of electromagnetic induction, the coils 4 and 5 generate AC voltages which are 90° shifted in phase and AC currents which are 90° shifted in phase. In the IC card P, the coupling coils 4 and 5 are connected to rectifier circuits 6 and 7, respectively.

The circuits 6 and 7 rectify the AC voltages into DC voltages. The DC voltages applied from the rectifier circuits 6 and 7 greatly depend on the magnetic coupling between the coils 4 and 5 of the IC card P on the one hand and the coils 1a and 1b of the card reader/writer 1 on the other. If these DC voltages are applied to any internal circuit of the IC card P, without being modified, the internal circuit may operate unstably. To prevent unstable operation of the internal circuit, the DC voltages are adjusted by a voltage-adjusting circuit 8 to a prescribed value, providing a power-supply voltage $V_{DD}$ for the IC card P.

The rectifier circuit 6 extracts a DC current $\phi 1x$ from the carrier wave received by the coupling coil 4. The DC current $\phi 1x$ has a constant amplitude. The DC current $\phi 1x$ is input to a wave-shaping circuit 9, which generates a data wave $\phi 1$. Meanwhile, the rectifier circuit 7 extracts a DC current $\phi 2x$ from the carrier wave received by the coupling coil 5. The DC current $\phi 2x$ has a constant amplitude. The DC current $\phi 2x$ is input to a wave-shaping circuit 10, which generates a data wave $\phi 2$. The data waves $\phi 1$ and $\phi 2$ are shifted in phase by 90°.

In the IC card P, the rectifier circuits 6 and 7 are connected to the coupling coils 4 and 5 so as to generate DC currents which are stable in a communication band. If the circuits 6 and 7 are directly connected to the coils 5 and 6, the wave-shaping circuits 9 and 10 will be unable to generate stable data waves. This is because a large current will flow into one of the rectifier circuits 6 and 7, reducing the current flowing into the other rectifier circuit, due to the magnetic coupling between the coils 4 and 5 on the one hand and the coils 1a and 1b of the card reader/writer 1 on the other hand. To flow substantially the same current into the rectifier circuits 6 and 7, two voltage-adjusting circuits (not shown) are provided at the outputs of the circuits 6 and 7, respectively, as will be described later in detail. These voltage-adjusting circuits enable the wave-shaping circuits 9 and 10 to generate stable data waves.

The voltage-adjusting circuit 8 generates not only the power-supply voltage $V_{DD}$, but also a reset signal RS for resetting a polarity-discriminating circuit 14 and a CPU 20. The reset signal RS is an active-low signal. It is set at low level when the power-supply voltage falls below the lowest operating voltage of the internal circuits of the IC card P, and is set at high level when the power-supply voltage rises above a predetermined operating voltage of the internal circuits. Thus, the CPU 20 is reset when the power-supply voltage falls below the lowest operating voltage of the internal circuits of the IC card P and is set when the power-supply voltage rises above the predetermined operating voltage of the internal circuits. The lowest operating voltage is lower than the predetermined operating voltage, about 70% of the predetermined operating voltage. Namely, the CPU 20 is reset with hysteresis.

More specifically, the reset signal RS is input to a reset timer 11. The reset timer 11 generates a system reset signal for resetting the CPU 20 and the circuits peripheral to the CPU 20. The system reset signal is an active-low signal, set at low level at the same time the reset signal RS falls to low level, and set at high level upon lapse of a predetermined time after the reset signal RS rises to high level. When the system reset signal falls to low level, it resets the CPU 20 and the peripheral circuits thereof.

The data waves $\phi 1$ and $\phi 2$ generated by the wave-shaping circuits 9 and 10 are input to a demodulating circuit 12. The circuit 12 demodulates the PSK-modulated data signals which the card reader/writer 1 has transmitted and which the coupling coils 4 and 5 have received.

The system clock signal for determining the operation timing of the internal circuits of the IC card P can be generated directly from the data wave $\phi 1$ or $\phi 2$. The data waves $\phi 1$ and $\phi 2$ are input to a clock-switching circuit 13, too. The circuit 13 outputs either the data wave $\phi 1$ or the data wave $\phi 2$, in accordance with a data signal output from the demodulating circuit 12 and a signal indicating a change in the data signal. (The change-indicating signal will be described later.)

One of the PSK-modulated carrier waves received at the coils 4 and 5 and phase-shifted by 90° has an envelope (i.e., amplitude) which greatly changes when the received data changes. This change in the envelope is due to the limited frequency band for the coupling coils 4 and 5 of the IC card P and also due to the limited frequency band for the resonant circuit provided in the card reader/writer 1 for applying a magnetic field to the coils 4 and 5. It is therefore difficult to generate a continuous clock signal from only one of the data waves $\phi 1$ and $\phi 2$. If the signal generated from one of these waves is used as the system clock signal, the IC card P may make a great error.

Generally, out of two PSK-modulated waves, a PSK-modulated wave whose phase first is delayed with respect to the other wave and then advanced with respect to the other wave has its amplitude greatly reduced, causing a change in its envelope. This is why the clock-switching circuit 13 selects the PSK-modulated wave whose phase is first advanced with respect to the other PSK-modulated wave and then delayed with respect to the other wave, thereby providing a continuous system clock signal. How the circuit generates the system clock signal will be explained, with reference to FIGS. 2, 3 and 4.

Figure 2:
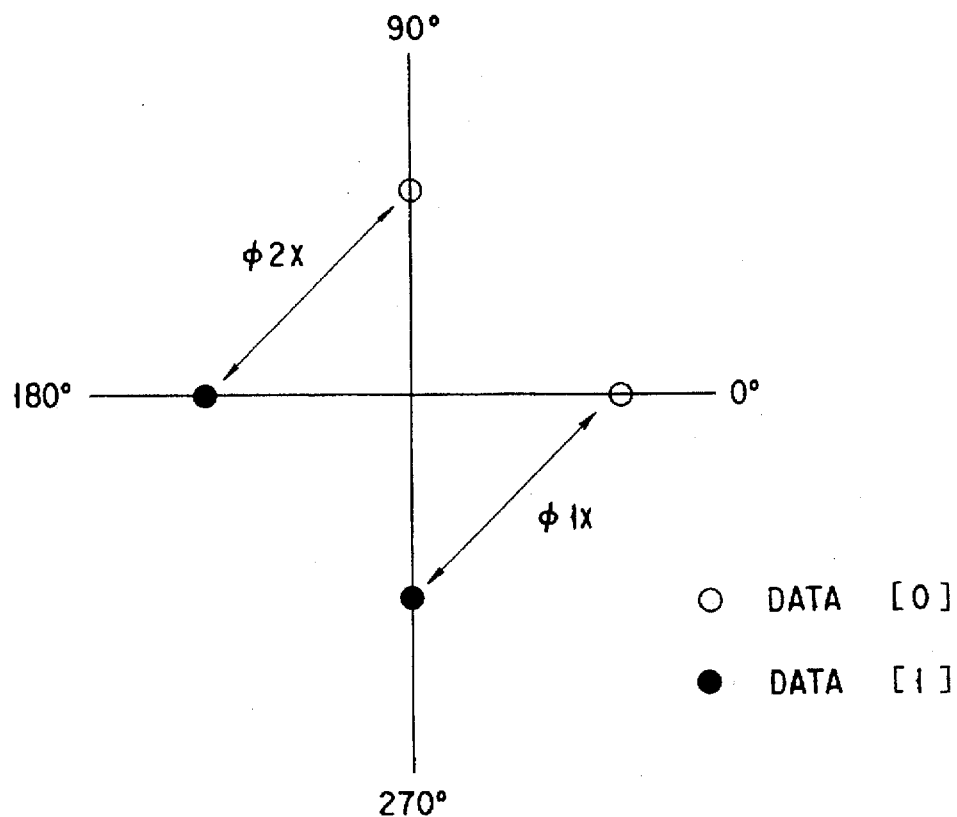
FIG. 2 is a diagram illustrating how the carrier waves received by the IC card change in phase.

FIG. 2 illustrates how the PSK-modulated carrier waves $\phi 1x$ and $\phi 2x$ received by the IC card change in phase. As seen from FIG. 2, the carrier wave $\phi 1x$ delays in phase by 90°, from 0° to 270° when the data changes from "0" to "1." On the other hand, the carrier wave $\phi 2x$ advances in phase by 90° from 90° to 180° when the data changes from "0" to "1." When the data changes from "1" to "0," the carrier wave $\phi 1x$ advances in phase by 90°, from 270° to 0°, whereas the carrier wave $\phi 2x$ delays in phase by 90°, from 180° to 90°. The phase-relation between the carrier wave $\phi 1x$ and $\phi 2x$ alters when the data changes. While the data is "0," the carrier wave $\phi 1x$ delays by 90° with respect to the carrier wave $\phi 2x$. Conversely, while the data is "1," the carrier wave $\phi 1x$ advances by 90° with respect to the carrier wave $\phi 2x$. The phase changes of the carrier waves may be defined differently by exchanging the positions of the carrier waves $\phi 1x$ and $\phi 2x$, shown in FIG. 2, or by exchanging the marks of data "0" and data "1" shown in FIG. 2.

Figure 3A:
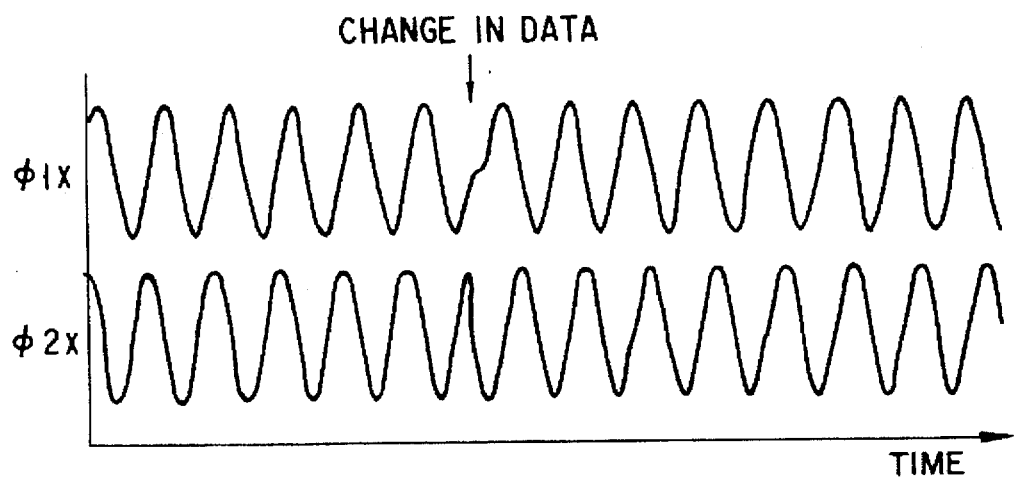
FIGS. 3A and 3B are diagrams representing the envelopes of the carrier waves received by the IC card change.
Figure 3B:
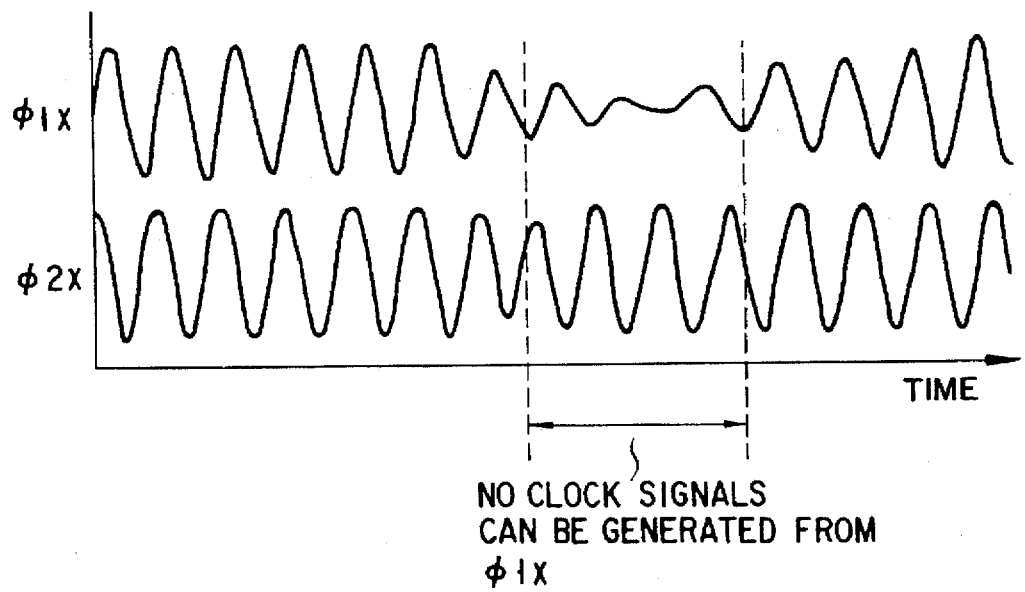

FIG. 3A represents the envelopes of ideal carrier waves $\phi 1x$ and $\phi 2x$ which have undergone no envelope changes. FIG. 3B illustrates the envelopes of carrier waves $\phi 1x$ and $\phi 2x$ which have undergone envelope changes due to the limited frequency band for the resonant circuit provided in the card reader/writer 1. These waves are products of half-wave rectification. For simplicity of explanation, however, they are illustrated in FIGS. 3A and 3B as if they were products of full-wave rectification.

When the data changes from "0" to "1," the carrier wave $\phi 1x$, which advances in phase, has its amplitude decreased only a little as shown in FIG. 3A, not so much as to effect the generation of the clock signal.

When the carrier wave $\phi 1x$ is first delayed with respect to the carrier wave $\phi 2x$ and then advanced with respect to the carrier wave $\phi 2x$ after the data has changed from "0" to "1", it undergoes an envelope change and has its amplitude decreased very much as illustrated in FIG. 3B. It is impossible to generate a clock signal from the carrier wave 1x. By contrast, the carrier wave $\phi 2x$ is first advanced with respect to the carrier wave $\phi 1x$ and then delayed with respect to the carrier wave $\phi 1x$ after the data has changed from "0" to "1". The $\phi 2x$ undergoes but a very little envelope change, and its amplitude decreases very little as shown in FIG. 3B. Thus, a clock signal can be generated from the carrier wave $\phi 2x$.

FIGS. 4A and 4B are timing charts, explaining how the clock-switching circuit 13 selects one of the data waves $\phi 1$ and $\phi 2$ and generates a system clock signal from the data wave selected. The circuit 13 receives both data waves $\phi 1$ and $\phi 2$ and detects the time at which either input data changes from "0" to "1" or vice versa. Upon the lapse of a predetermined time from the data change detected, or at the time the data phase becomes stable, the circuit 13 switches the data wave, from $\phi 1$ to $\phi 2$ or vice versa. It is desirable to switch the data wave at any time in the period between the midpoint between any two consecutive changes in data and the later one of these changes in data. This is because, generally the phase of the data is most stable during that period.

Therefore, the clock-switching circuit 13 selects the data wave, $\phi 1$ when the data changes from "0" to "1" or when it receives a data-transmission signal of logic value "1" from the CPU 20, and selects the data wave $\phi 2$ when the data changes from "1" to "0."

As shown in FIG. 4A, the clock-switching circuit 13 switches the data wave, from $\phi 1$ to $\phi 2$, upon the lapse of a predetermined time after the data has changed from "1" to "0." In this case, the cycle period of the system clock signal, i.e., the data wave $\phi 2$, becomes longer by one-fourth the original cycle period T. That is, the cycle period of the system clock signal is 1.25 T. Nonetheless, this system clock signal does not influence at all the operation of the CPU 20 which receives the signal as an operation timing signal.

As shown in FIG. 4B, the circuit 13 switches the data wave, from $\phi 2$ to $\phi 1$, upon the lapse of a predetermined time after the data has changed from "0" to "1." In this case, too, the cycle period of the system clock signal, i.e., the data wave $\phi 1$, becomes longer by about one-fourth the original cycle period T. As a result, the input signal selected as the system clock signal is always one which has the smaller envelope change.

As shown in FIG. 1, the demodulated data signal output from the demodulating circuit 12 is input to the polarity-discriminating circuit 14. The circuit 14 is reset at a prescribed logical value (e.g., "0") by a system reset signal (at low level). The data signal, which is a serial data signal, is input via the circuit 14 to a serial interface section 15. The circuit 15 converts the data signal to 16-bit or 32-bit parallel data, in synchronism with the system clock signal. The parallel data can be processed under the control of the CPU 29.

The CPU 20 is connected by a data bus to a ROM 21, a RAM 22, an EEPROM 23 and the serial interface section 15. The CPU 20 is controlled by the system clock signal output from the clock-switching circuit 13.

The ROM 21 stores control programs for the CPU 20. The RAM 22 is provided for temporarily storing various data items the CPU 20 generated by processing input data. The EEPROM 23 stores various data items about the holder to the IC card P, such as the identification number assigned to the card holder and the personal data of the card holder. The CPU 20 processes the data input to it from the serial interface section 15 in accordance with the control programs stored in the ROM 21, thereby generating various data items. The data items generated by the CPU 20 are temporarily stored in the RAM 22.

It will now be explained how data is transmitted from the IC card P to the card reader/writer 1. First, the data is supplied to the serial interface section 15 under the control of the CPU 20. The section 15 converts the data to a serial data signal. The data signal is supplied to a modulating circuit 16.

The circuit 16 changes the impedance of the coupling coil 5 in accordance with the serial data signal. The current flowing through the coil 1b of the card reader/writer 1 changes since the coil 1b is magnetically coupled with the coil 5. Thus, the card reader/writer detects the data transmitted from the IC card P. The modulating circuit 16 decreases the load impedance of the coupling coil 5 for the half-cycle period of the carrier wave. Generally, however, it suffices to change the load impedance of the coil 4 or the coil 5, or the load impedances of both coils 4 and 5.

The coupling condition between the coils 4 and 5, and the coils 1a and 1b, greatly depends upon the positional relation of the IC card P and the card reader/writer 1. To transmit data stably from the IC card P to the card reader/writer 1 even if that coupling condition changes, the currents induced from the half waves of the high-frequency carrier waves are increased in the present embodiment. Data can therefore be stably transmitted, minimizing the power loss in the IC card P and also increasing the S/N (Signal-to-Noise) ratio of the data signals.

When the load impedance of the coupling coil 5 is changed for the half-cycle period of the carrier wave, the duty factor of the data wave φ2 may change. Nonetheless, the phase of the data wave φ2 remains unchanged with respect to the phase of the data wave φ1. The IC card P can receive data from the card reader/writer, while transmitting data thereto. In the IC card P, a system clock signal having a desired duty factor may be required to transmit data to the card reader/writer. If so, it suffices to select the data wave φ1 received at the coil 4 not being used to transmit data to the card reader/writer 1 and to use the data wave φ1 as the system clock signal. In this case, the CPU 20 supplies to an OR circuit 24 a signal which indicates that the data is to be transmitted from the IC card P. In accordance with this signal, the clock-switching circuit 13 selects the data wave φ1.

The components of the IC card P will be described in greater detail, with reference to FIGS. 5, 6 and 7. In these figures, the components identical to those shown in FIG. 1 are designated at the same reference numerals.

Figure 5:
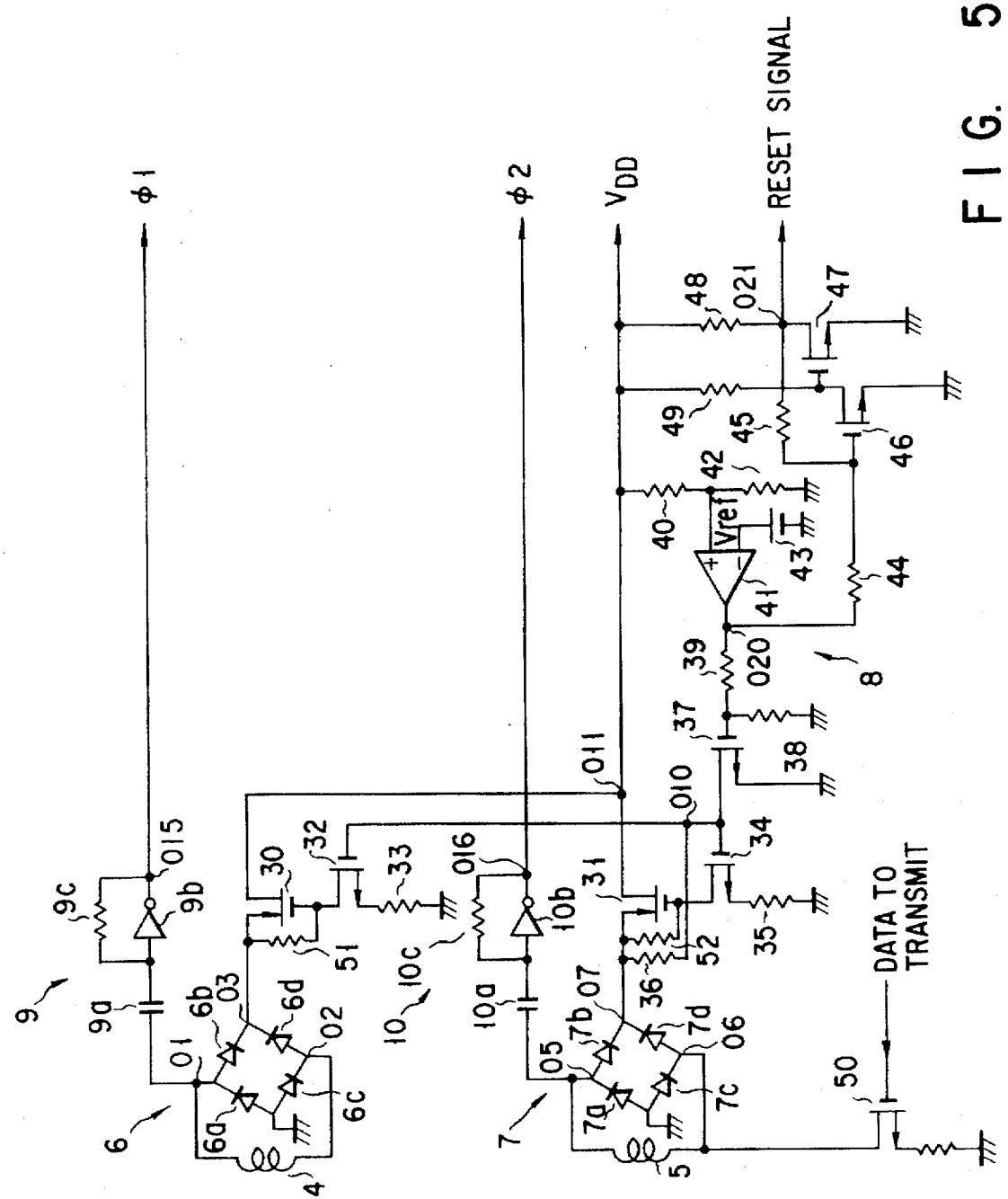
FIG. 5 is a circuit diagram showing a part of the non-contact IC card of FIG. 1.

As shown in FIG. 5, the rectifier circuit 6 is a bridge circuit of ordinary type, comprised of four diodes 6a, 6b, 6c and 6d. The coupling coil 4 has one end connected to the node O1 of the cathode of the diode 6a and the anode of the diode 6b, and the other end connected to the node O2 of the cathode of the diode 6c and the anode of the diode 6d. The node of the anodes of the diodes 6a and 6c is connected to the ground. When a high-frequency magnetic field is applied to the coupling coil 4, an AC voltage is generated between the ends of the coupling coil 4. The rectifier circuit 6, or the bridge circuit, rectifies the AC voltage, whereby a DC voltage is generated by full-wave rectification at the node O3 of the cathodes of the diodes 6b and 6d.

Like the rectifier circuit 6, the rectifier 7 is a bridge circuit comprised of four diodes 7a, 7b, 7c and 7d. The coupling coil 5 has one end connected to the node O5 of the cathode of the diode 7a and the anode of the diode 7b, and the other end connected to the node O6 of the cathode of the diode 7c and the anode of the diode 7d. The node of the anodes of the diodes 7a and 7c is connected to the ground. When a high-frequency magnetic field is applied to the coupling coil 5, an AC voltage is generated between the ends of the coupling coil 5. The rectifier circuit 7 rectifies the AC voltage, whereby a DC voltage is generated by full-wave rectification at the node O7 of the cathodes of the diodes 7b and 7d. The node O3 in the rectifier circuit 6 is connected to the source of a p-channel MOSFET 30 (hereinafter referred to as "FET 30") incorporated in the voltage-adjusting circuit 8. The node O7 in the rectifier circuit 7 is connected to the source of a p-channel MOSFET 31 (hereinafter referred to as "FET 31") provided in the voltage-adjusting circuit 8.

The DC voltages generated by the rectifier circuits 6 and 7 are applied to the voltage-adjusting circuit 8. In the voltage-adjusting circuit 8, the gate of the FET 30 is connected to the drain of an n-channel MOSFET 32 (hereinafter referred to as "FET 32"). The source of the FET 32 is connected to one end of a resistor 33, the other end of which is connected to the ground. The FET 32 and the resistor 33 constitute a constant current circuit. The gate of FET 31 is connected to the drain of an n-channel MOSFET 34 (hereinafter referred to as "FET 34"). The source of the FET 34 is connected to one end of a resistor 35, the other end of which is connected to the ground. The FET 34 and the resistor 35 constitute a constant current circuit.

The gate of the FET 32 is connected to the gate of the FET 34. The node O10 of the gates of the FETs 32 and 34 is connected to one end of a resistor 36, the other end of which is connected to the source of the FET 31. The node O10 is connected also to the drain of an n-channel MOSFET 37 (hereinafter referred to as "FET 37"). The source of the FET 37 is connected to the ground. Resistors 38 and 39 are connected at one end to the gate of the FET 37. The other end of the resistor 38 is connected to the ground.

The drains of the FETs 30 and 31 are connected, forming a node O11. The power-supply voltage is applied from the node O11 to one end of a resistor 40. The other end of the resistor 40 is connected to the non-inverting input of a difference amplifier 41 and one end of a resistor 42. The other end of the resistor 42 is connected to the ground. The inverting input of the difference amplifier 41 is connected to a reference voltage source Vref 43. The output of the amplifier 41 is connected to the other end of the resistor 39, forming a node O20. The node O20 is connected to one end of a resistor 44. The other end of the resistor 44 is connected to one end of a resistor 45 and also to the the gate of an n-channel MOSFET 46 (hereinafter referred to as "FET 46").

The drain of the FET 46 is connected to one end of a resistor 49, the other end of which is connected to the node O11 to receive the power-supply voltage. The source of the FET 46 is connected to the ground. The drain of the FET 46 is connected to the gate of an n-channel MOSFET 47 (hereinafter referred to as "FET 47"). The drain of the FET 47 is connected to one end of a resistor 48, the other end of which is connected to the node O11 for receiving the power-supply voltage. The source of the FET 47 is connected to the ground. The other end of the resistor 45 is connected to the drain of the FET 47, forming a node O21. It is from the node O21 that the reset signal RS is output to the the reset timer 11.

Figure 6:
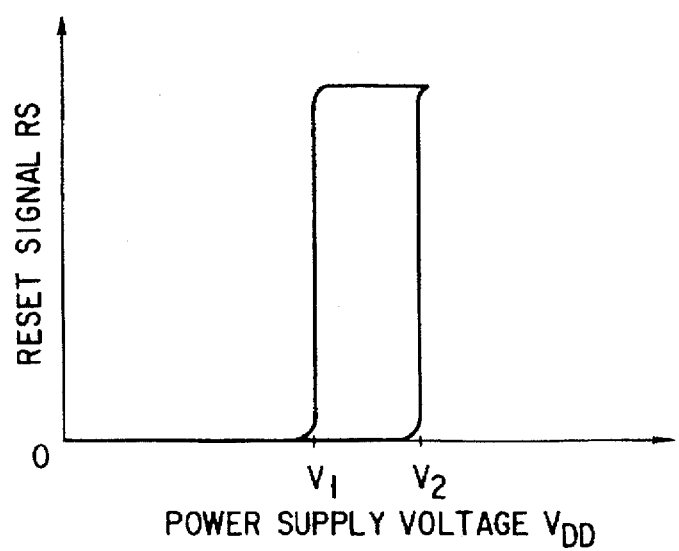
FIG. 6 is a graph representing the relation which the reset signal and the power-supply voltage have in the IC card.

When the voltages output from the rectifier circuits 6 and 7 rise above the predetermined operating voltage, the output voltage of the difference amplifier 41, i.e., the power-supply voltage $V_{DD}$, rises to a value V2, as is illustrated in FIG. 6. This value V2 is given as:

$$V2=(R40+R42)\times Vref/R42$$

where R40 and R42 are resistances of the resistors 40 and 42 and Vref is the reference voltage applied from the voltage source 43.

The FETs 37, 34, 32, 30 and 31 operate, preventing the currents output by the rectifier circuits 6 and 7 from flowing to the node O11. As a result, the DC voltages at the node O11 no longer increases. The output voltage of the difference amplifier 41 is applied via the resistor 44 to the FETs 46 and 47, whereby the reset signal RS supplied from the node O21 rises to high level. The power-supply voltage $V_{DD}$ remains at value V2 as long as the output voltages of the rectifier circuits 6 and 7 are sufficiently high.

When the voltages output from the rectifier circuits 6 and 7 decrease, the voltage at the node O11 can no longer remain at value V2. The gate voltage of the FET 46 falls below its threshold value. The FET 46 is turned on, whereby the reset signal RS decreases to value V1 as shown in FIG. 6. Namely, the reset signal RS is output to the reset timer 11.

Thereafter, when the voltages output from the rectifier circuits 6 and 7 rise again above the value V2, the output voltage of the error amplifier 41 rises to high level. Simultaneously the reset signal RS rises to a high level. As a result of this, the reset state is released.

In this way, the reset operation of the present invention has hysteresis. Thus, even if the magnetic fields applied to the coupling coils 4 and 5 change, fluctuating the power-supply voltage $V_{DD}$ to some degree, the CPU 20 is not reset. This ensures a stable operation of the IC card P.

Each rectifier circuit 6 and 7 is provided with a voltage-adjusting circuit independently. A first voltage-adjusting circuit is provided for the rectifier circuit 6, and a second voltage-adjusting circuit for the rectifier circuit 7. The first voltage-adjusting circuit comprises the FET 30, a resistor 51, the FET 32, and the resistor 33. The second voltage-adjusting circuit comprises the FET 31, a resistor 52, the FET 34, and the resistor 35. Both voltage-adjusting circuits are controlled by the output voltage of the error amplifier 41. Hence, currents of substantially the same value always flow through the rectifier circuits 6 and 7 even if the coils 1a and 4 are magnetically coupled in a condition different from the condition in which the coils 1b and 5 are magnetically coupled and the magnetic fields applied to the coupling coils 4 and 5 do not have the same intensity.

The carrier wave $\phi 1x$ is output from the node O1 in the rectifier circuit 6 and supplied to the wave-shaping circuit 9. The wave-shaping circuit 9 comprises a capacitor 9a, an inverter 9b, and a resistor 9c. The capacitor 9a is connected at one end to the node O1 and at the other end to the input of the inverter 9b and one end of the resistor 9c. The output of the inverter 9b is connected to the other end of the resistor 9c, forming a node O15. A wave-shaped pulse signal, i.e., data wave $\phi 1$, is output from the node O15.

Meanwhile, the carrier wave $\phi 2x$ is output from the node O5 in the rectifier circuit 7 and supplied to the wave-shaping circuit 10. The wave-shaping circuit 10 comprises a capacitor 10a, an inverter 10b, and a resistor 10c. The capacitor 10a is connected at one end to the node O5 and at the other end to the input of the inverter 10b and one end of the resistor 10c. The output of the inverter 10b is connected to the other end of the resistor 10c, forming a node O16. A wave-shaped pulse signal, i.e., data wave $\phi 2$, is output from the node O16.

As described above, the first and second voltage-adjusting circuits are provided for the rectifier circuits 6 and 7, respectively, and currents of substantially the same value flow through the circuits 6 and 7. The data waves $\phi 1$ and $\phi 2$, output from the rectifier circuits 9 and 10, are therefore stable.

The reset timer 11, the demodulating circuit 12, the clock-switching circuit 13, and the polarity-discriminating circuit 14 will now be described in detail, with reference to FIG. 7.

The reset timer 11 comprises a counter circuit 11a which has a reset input terminal, a clock input terminal, a data input terminal, and a data output terminal. The reset signal RS is supplied to the reset input terminal from the voltage-adjusting circuit 8. The data wave $\phi 2$ is supplied to the clock input terminal. The power-supply voltage $V_{DD}$ is applied to the data input terminal, and a signal at high level is always supplied thereto. When the reset signal RS falls from high level to low level, the reset timer 11 is reset. Meanwhile, system reset signal from the data output terminal becomes low level, and the system is reset. When the reset signal RS rises from low level to high level, the timer 11 is released from the reset state, and the count of the counter circuit 11a increases until it reaches a preset value. Upon the lapse of the time defined by the preset count value of the counter 11a, the system reset signal output from the data output terminal rises to high level. As a result, the CPU 20 is released from the reset state.

The demodulating circuit 12 comprises a flip-flop circuit 12a (hereinafter referred to as "FF circuit 12a") which has a data input terminal, a clock input terminal, and a data output terminal. The FF circuit 12a can easily demodulate the data waves $\phi 1$ and $\phi 2$, i.e., PSK-modulated signals, since the data waves have a phase difference of 90°. This a typical characteristic of the PSK modulation. The data wave $\phi 1$ is supplied to the data input terminal of the FF circuit 12a, and the data wave $\phi 2$ to the clock input terminal thereof. The FF circuit 12a produces a demodulated data signal, which is output from the data output terminal.

The clock-switching circuit 13 will be described. As shown in FIG. 7, the circuit 13 comprises an FF circuit 13a, an exclusive OR circuit 13b (hereinafter referred to as "EXOR circuit 13b"), a counter circuit 13c, an FF circuit 13d, an OR circuit 24, and a switch 13e. The data input terminal of the FF circuit 13a is connected to the data output terminal of the FF circuit 12a incorporated in the demodulating circuit 12. The clock input terminal of the FF circuit 13a is connected to receives the data wave $\phi 2$. The data output terminal of the FF circuit 12a is connected to one of the input of the EXOR circuit 13b. The other input terminal of the EXOR circuit 13b is connected to the data output terminal of the FF circuit 12a of the demodulating circuit 12. Hence, a signal representing the change in the data received is output from the data output terminal of the FF circuit 12a for the one-cycle period of the EXOR circuit 13b.

Also connected to the data output terminal of the FF circuit 12a of the demodulating circuit 12 are the data input terminal of the counter circuit 13c and the data input terminal of the FF circuit 13d. The counter circuit 13c has its clock input terminal connected to receive the data wave $\phi 2$, its reset input terminal connected to the output terminal of the EXOR circuit 13b, and its data output terminal connected to the clock input terminal of the FF circuit 13d.

A switch timing signal is output from the data output terminal of the FF circuit 13d. The timing signal is generated upon lapse of, as described above, the predetermined time preset in the counter circuit 13c, measured from the moment the EXOR circuit 13b has detected the change of the data. The predetermined time is as long as is required for the data phase to become stable after the change in the data. It is after the data phase becomes stable that the data waves $\phi 1$ and $\phi 2$ are switched from one to another.

To transmit data from the IC card P, the data wave $\phi 1$ the coil 4 not used to transmit the carrier wave is used as the system clock signal. In this case, the CPU 20 supplies to the first input of the OR circuit 24 a signal which indicates that data will be transmitted from the IC card P, and the signal output from the OR circuit 24 is input to the switch 13e as the switch timing signal. The switch 13e selects either the data wave $\phi 1$ or the data wave $\phi 2$ in accordance with the switch timing signal. The data wave, thus selected, is output as the system clock signal.

Figure 7:
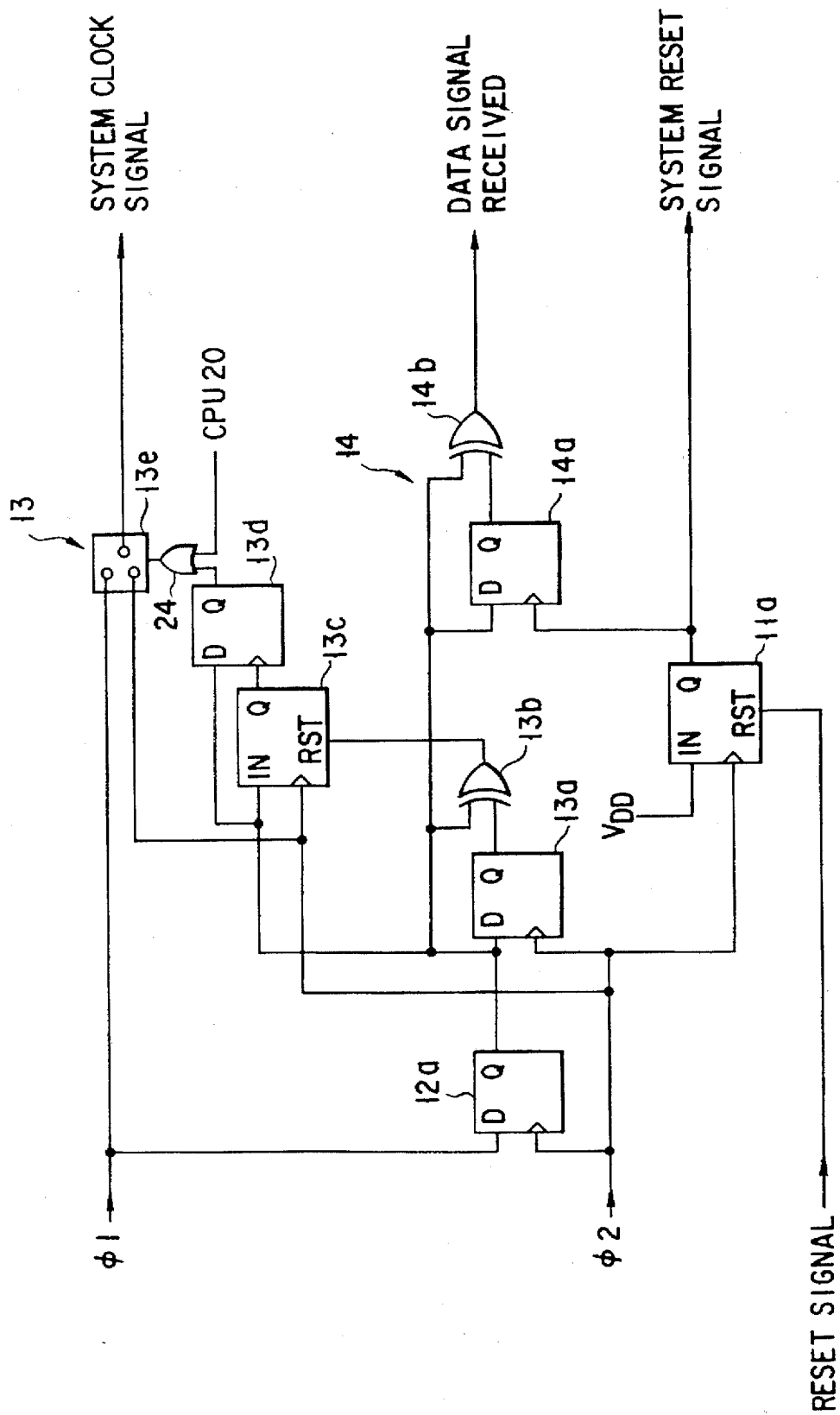
FIG. 7 is a circuit diagram showing another part of the non-contact IC card of FIG. 1.

As shown in FIG. 7, the polarity-discriminating circuit 14 comprises an FF circuit 14a and an EXOR circuit 14b. The FF circuit 14a has its data input terminal connected to the output terminal of the FF circuit 12a provided in the demodulating circuit 12, its clock input terminal connected to receive the system clock signal, and its output terminal connected to one input terminal of the EXOR circuit 14b. The other input terminal of the EXOR circuit 14b is connected to the output terminal of the FF circuit 12a. Thus, when the system reset signal rises to high level, the EXOR circuit 14b outputs a signal at a preset logic level from its output terminal.

Referring back to FIG. 5, the data signal output from the modulating circuit 16 is supplied to the gate of an n-channel MOSFET 50 (hereinafter referred to as "FET 50") incorporated in a data-transmitting circuit. The FET 50 has its source connected to the ground and its drain connected to the node O6 in the rectifier circuit 7. The FET 50 is in the on state for the half-cycle period of the carrier wave, in accordance with the data to be transmitted. When the FET 50 is turned on, the input impedance of the receiving circuit including the coil 5 and the rectifier circuit 7 decreases. As a result, source current of the FET 50 increases for the half cycle period of the carrier wave, i.e., a high-frequency AC signal. The load impedance of the coupling coil 1b incorporated in the card reader/writer 1 decreases, and the current flowing in the coil 1b increases. This increase in the current, i.e., the data transmitted from the IC card P, is detected in the card reader/writer 1.

As has been described above, the present invention can provide a non-contact data recording medium which incorporates neither a PLL circuit nor an oscillator circuit, which can yet generate a stable clock signal, the internal circuits of which can perform stable operations including data receipt and transmission, and which can be easily made in the form of an LSI.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A non-contact data recording medium which has internal circuits and in which a data signal is demodulated from a carrier wave transmitted from an external device and the carrier wave is used as a clock signal for the internal circuits, said medium comprising:

first and second carrier-wave receiving means for receiving first and second carrier waves, respectively, which are shifted in phase with respect to each other;

first and second wave-shaping means for shaping waveforms of the first and second carrier waves received by said first and second carrier-wave receiving means;

demodulating means for demodulating the carrier waves having waveforms shaped by said first and second wave-shaping means to generate a data signal;

detecting means for detecting a change in a data value of the data signal generated by said demodulating means; and selecting means for selecting as the clock signal one of said first and second carrier waves having waveforms shaped by said first and second wave-shaping means, in accordance with the change in the data value which said detecting means has detected.

2. The non-contact data recording medium according to claim 1, wherein said detecting means includes second detecting means for detecting a time point of the change of the data signal generated by said demodulating means, and said selecting means includes second selecting means for selecting as the clock signal one of the first and second carrier waves in which data change is not detected, in accordance with the data value which has changed, upon lapse of a predetermined time after said second detecting means has detected the change in the data value.

3. The non-contact data recording medium according to claim 2, in which said first and second carrier-wave receiving means have each an input impedance functioning as a load of the external device, which further comprises data-transmitting means for transmitting data from the medium to the external device by changing the input impedance in accordance with the data, thereby to change the load impedance, wherein the external device detects a change in the load, thereby to detect the data transmitted.

4. The non-contact data recording medium according to claim 3, said data-transmitting means has means for decreasing the input impedance of one of said first and second carrier-wave receiving means for a half-cycle period of said carrier waves.

5. The non-contact data recording medium according to claim 3, wherein said data-transmitting means includes second data-transmitting means for transmitting data from the recording medium to the external device using one of said first and second carrier-wave receiving means, and wherein said data-transmitting means further comprises control means for controlling said selecting means such that said selecting means selects the carrier wave which is not used by said second data-transmitting means when said second data-transmitting means transmits data.

6. A non-contact data recording medium which has internal circuits and in which a power-supply voltage generated from a carrier wave transmitted from an external device is applied to the internal circuits, the carrier wave is demodulated, and data is transmitted, said medium comprising:

first and second carrier-wave receiving means for receiving first and second carrier waves, respectively, which are shifted in phase with respect to each other;

first and second power-supply means for rectifying the first and second carrier waves received by said first and second carrier-wave receiving means, thereby applying direct-current voltages to the internal circuits;

constant-current means for adjusting current flowing to said first and second power supply means such that current flows in both said first and second power supply means;

voltage-adjusting means for adjusting the direct-current voltages applied from said first and second power supply means to a voltage of a predetermined value;

first and second wave-shaping means for shaping waveforms of the first and second carrier waves received by said first and second carrier-wave receiving means; and demodulating means for demodulating said first and second carrier waves having waveforms shaped by said first and second wave-shaping means, thereby generating a data signal.

7. The non-contact data recording medium according to claim 6, further comprising a reset circuit for resetting the internal circuits when the direct-current voltages applied from said first and second power-supply means fall below the lowest operating voltage for the internal circuits, and activating the internal circuits when the direct-current voltages rise above a predetermined operating voltage for the internal circuits, said lowest operating voltage being lower than said predetermined operating voltage.

8. The non-contact data recording medium according to claim 6, further comprising detecting means for detecting a change in a data value of the data signal generated by said demodulating means, and selecting means for selecting as a clock signal for the internal circuits one of said first and second carrier waves having waveforms shaped by said first and second wave-shaping means, in accordance with the change in the data value which said detecting means has detected.

9. The non-contact data recording medium according to claim 6, wherein said first and second carrier-wave receiving means each have an input impedance functioning as a load of the external device, and wherein said recording medium further comprises data-transmitting means for transmitting data from the recording medium to the external device by changing the input impedance in accordance with the data to change the load impedance, and wherein the external device detects a change in the load to detect the data transmitted.

10. The non-contact data recording medium according to claim 6, wherein said voltage-adjusting means controls said constant current means to equalize the current flowing in said first and second power supply means.

11. A non-contact data recording medium which has internal circuits and in which a power-supply voltage generated from a carrier wave transmitted from an external device is applied to the internal circuits, the carrier wave is demodulated, and data is transmitted, said medium comprising:

first and second coils for receiving first and second carrier waves from the external device, said first and second carrier waves being shifted in phase with respect to each other;

a first rectifying circuit connected to said first coil for rectifying the first carrier wave to generate a first direct-current voltage;

a second rectifying circuit connected to said second coil for rectifying the second carrier wave to generate a second direct-current voltage;

a first constant current circuit provided in said first rectifying circuit for adjusting the current in said first rectifying circuit to a first constant current;

a second constant current circuit provided in said second rectifying circuit for adjusting the current flowing in said second rectifying circuit to a second constant current;

a voltage adjusting circuit for adjusting said first and second direct-current voltages generated by said first and second rectifying currents such that said first and second direct-current voltages have the same value, and for controlling said first and second constant current circuits to equalize said first and second constant currents flowing in said first and second rectifying circuits;

a first wave shaping circuit for shaping the waveform of said first carrier wave received by said first coil;

a second wave-shaping circuit for shaping the waveform of said second carrier wave received by said second coil; and demodulating means for demodulating said first and second carrier waves having waveforms shaped by said first and second wave-shaping means, thereby generating a data signal.

12. The non-contact data recording medium according to claim 11, further comprising a reset circuit for resetting the internal circuits when said first and second direct-current voltages applied from said first and second rectifying circuits fall below the lowest operating voltage for the internal circuits, and activating the internal circuits when said first and second direct-current voltages rise above a predetermined operating voltage for the internal circuits, said lowest operating voltage being lower than said predetermined operating voltage.

13. The non-contact data recording medium according to claim 11, further comprising detecting means for detecting a change in a data value of the data signal generated by said demodulating means, and selecting means for selecting as a clock signal for the internal circuits one of said first and second carrier waves having waveforms shaped by said first and second wave-shaping circuits in accordance with the change in the data value which said detecting means has detected.

14. The non-contact data recording medium according to claim 11, wherein said first and second coils each have an input impedance functioning as a load of the external device, and wherein said recording medium further comprises data-transmitting means for transmitting data from the recording medium to the external device by changing the input impedance in accordance with the data to change the load impedance, and wherein the external device detects a change in the load to detect the data transmitted.

* * * * *